Patented Jan. 15, 1946

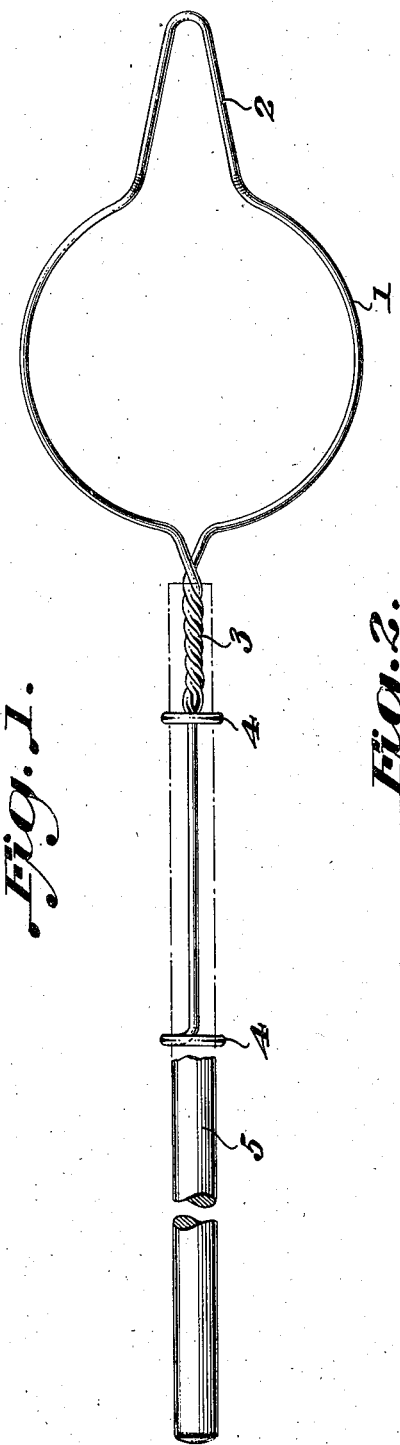
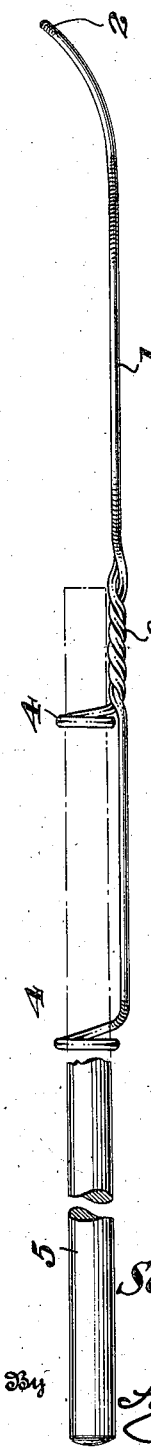
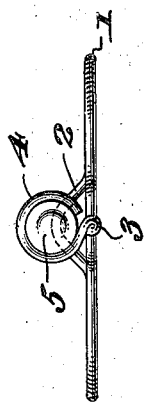

2,393,107

UNITED STATES PATENT OFFICE 2,393,107

FRUIT PICKER

Samuel Johnson, Sr., Clermont, Fla., assignor of one-half to Stuart H. Bowman, Clermont, Fla.

Application October 2, 1944, Serial No. 556,822

1 Claim. (Cl. 56—339)

This invention relates to fruit pickers, and more particularly to devices for harvesting fruits, particularly fruits of select character which are subject to injury if allowed to drop on the ground when shaken or otherwise detached from the tree, or fruits growing out of arm reach in which case the trees are apt to be damaged when subjected to former methods and means of picking.

One of the problems in connection with the picking or harvesting of citrus fruits, including grapefruit and oranges, is to gather them simply, quickly, and without injury or damage to the fruit or to the trees. The gathering of the fruit has been done in various ways, usually by hand, with the use of ladders and other devices on which the picker climbs to harvest the fruit. The problem of picking is therefore a very constant and important consideration.

It is an object of the invention to provide an inexpensive, simple, and practical picking implement, by means of which fruit may be more quickly and efficiently harvested without injury to the trees.

The invention contemplates a body of wire, or the like, substantially circular in configuration, which may be inserted over the fruit, the ends of the wire being twisted together to form a grip, by means of which the device is adapted to be attached to a handle of the desired length to reach the fruit to be gathered. The portion of the loop diametrically opposite the grip portion is extended to form a pair of converging stem severing members, and with the members connected and similarly curved to conform to the curvature of the surface of the fruit gathered. This curvature makes it possible to exert proper pressure to detach the fruit from the stem without damage to the stem or branches of the tree or to the fruit.

The handle may consist of one or more sections, and of a total length corresponding to the requirements in accordance with the height at which the fruit is grown. The handle may be attached to the head of the device in any desired manner, but preferably solidly to facilitate the use of the device.

In the detachment of the fruit, as for example, the picking of grapefruit, the loop or curved portion of the body is presented from below to each individual grapefruit with the convex portion of the detaching tip skyward, and the concave portion of the tip in contact with the fruit, the tip engaging the stem in close proximity to its attachment to the fruit, whereupon a retraction of the tip, i. e., a substantial horizontal movement or pulling of the point of the tip with a quick movement across or at right angles to the stem will easily detach the stem from the fruit and allow the fruit to respond to the force of gravity.

Further objects and advantages of my invention will be apparent from the following specification taken in conjunction with the accompanying drawing, wherein:

Fig. 1 is a plan view of a device in accordance with the present invention; a pole or handle of conventional design being illustrated partially in broken line and with fragments in elevation;

Fig. 2 is a side elevation taken at right angles to that of Fig. 1, and showing particularly the curved tip portion; and Fig. 3 is an end view.

Referring to the drawing, a fruit picker in accordance with the present invention is formed of a single piece of wire, the mid or body portion 1 of which is of substantially circular form and of a size to permit the fruit to be gathered or harvested to pass readily therethrough. A detaching tip 2 is provided which consists of a pair of side portions which extend from the circular part of the body portion and converge substantially to a point, thereby forming a substantially V-shaped detaching tip. The converging side members of the detaching tip are curved out of the plane of the mid-portion to conform in curvature substantially to the surface configuration of the fruit, so that the tip may engage the same in close proximity to the fruit.

The free ends of the wire are twisted together to form a support 3 for the picker, and the ends after being twisted are provided with loops or rings 4 for the reception of a pole, or attachment to a handle 5, which may be of conventional construction.

It will be obvious to those skilled in the art that various changes may be made in the invention without departing from the spirit and scope thereof and therefore the invention is not limited by that which is shown in the drawing and described in the specification but only as indicated in the appended claim.

What is claimed is:

A fruit picker of a single piece of wire, the mid-portion thereof being of substantially circular form and of a size to permit the fruit to be harvested to pass therethrough, with the ends of the wire forming handle gripping means, and the body opposite the handle gripping means extending radially in substantially V-shaped formation to provide a detaching tip, with side portions converging substantially to a point, and with said side portions curved out of the plane of the mid-portion to conform substantially to the surface configuration of the fruit, so that said tip may engage the same in close proximity to the fruit.

SAMUEL JOHNSON, Sr.